United States Patent [19]
Oles

[11] Patent Number: 6,047,130
[45] Date of Patent: Apr. 4, 2000

[54] APPARATUS AND METHOD FOR PORTRAIT PHOTOGRAPHY

[75] Inventor: Henry Oles, San Marcos, Tex.

[73] Assignee: Environmental Protection Systems, Inc., San Marcos, Tex.

[21] Appl. No.: 08/802,504

[22] Filed: Feb. 20, 1997

Related U.S. Application Data

[63] Continuation of application No. 08/427,147, Apr. 24, 1995, abandoned.

[51] Int. Cl.[7] .......................... G03B 15/00; G03B 17/48; G03B 29/00
[52] U.S. Cl. ................................. 396/1; 396/3; 396/429; 348/64
[58] Field of Search .............................. 348/64, 61, 722, 348/561, 581, 240; 354/290, 76; 395/133, 135; 396/3, 1, 429

[56] References Cited

U.S. PATENT DOCUMENTS

| | | | |
|---|---|---|---|
| 4,714,962 | 12/1987 | Levine | 358/209 |
| 4,738,526 | 4/1988 | Larish | 354/412 |
| 4,772,941 | 9/1988 | Noble . | |
| 5,017,953 | 5/1991 | Biondo | 354/83 |
| 5,060,171 | 10/1991 | Steir et al. | 364/521 |
| 5,223,879 | 6/1993 | Chao | 354/292 |
| 5,237,648 | 8/1993 | Mills et al. | 395/133 |
| 5,325,470 | 6/1994 | Sumino et al. | 395/121 |
| 5,389,984 | 2/1995 | Lovenheim | 354/76 |
| 5,398,308 | 3/1995 | Kato et al. | 395/133 |
| 5,491,517 | 2/1996 | Kreitmann et al. | 348/581 |
| 5,666,215 | 9/1997 | Fredlund et al. | 358/487 |
| 5,897,220 | 4/1999 | Huang et al. | 396/2 |

OTHER PUBLICATIONS

Digital 8.0 System Brochure, last page.
Instant Proofing System, Dr. Harry J. Oles.
Studio Pro TM Instant Preview Systems brochure.

*Primary Examiner*—Safet Metjahic
*Assistant Examiner*—Christopher Mahoney
*Attorney, Agent, or Firm*—Booth & Wright, L.L.P.; Matthew J. Booth

[57] ABSTRACT

The present invention is an apparatus and method that includes a photographic camera synchronized to a video camera with a computer and viewing monitors in a unique combination that allows professional photography customers to visually determine the appropriate size of a portrait photograph and matching picture frame by displaying upon a viewer a perspective view of a video image of the photographic image and the matching picture frame within a simulated room image.

12 Claims, 5 Drawing Sheets

APPARATUS AND METHOD FOR PORTRAIT PHOTOGRAPHY

This application is a continuation, of application Ser. No. 08/427,147, filed Apr. 24, 1995, now abandoned.

BACKGROUND OF THE INVENTION

1. Field of the Invention

The present invention relates to a method and apparatus for portrait photography. More particularly, the present invention allows a customer to visually determine the appropriate size of a portrait photograph and matching picture frame by displaying upon a viewer a perspective view of a video image of the photograph and the matching frame within a simulated room image.

2. Description of the Related Art

Two large difficulties for professional photographers are selling correctly sized portrait photographs and the corresponding picture frames for the photographs to prospective purchasers. The first problem is that it is impractical for a photographer to maintain in stock every existing style and color of frame for display and even more impractical for the photographer to manually display the portrait photograph in every possible picture frame for examination by the customer. The customer's burden is having to speculate which of the many styles and types of picture frames will best complement and display the portrait photograph. Likewise, the photographer has the dilemma of selling portrait photographs with a matching picture frame to a customer who is uncertain as to portrait dimensions, style of frame, and even the location where the portrait photograph will ultimately hang. The second problem occurs because customers routinely select the wrong size of a portrait photograph such as an 8"×10" size when in fact a 20"×24" size would be more appropriate for the setting and location of the portrait. The customer typically will choose the smaller print because it is the "safer" choice. Only after the portrait photograph with matching picture frame is taken home and the purchase transaction finalized will the customer realize that the larger print was the better choice. The truth is that the customer is unable to make the optimal purchase decision without having first made a decision regarding these preliminary matters. As a result of these deficiencies in the selling process, the portrait photographer does not find it economically feasible to offer frames for purchase and is unable to generate significant sales of the larger sized portrait photographs.

One of the newer technologies entering into the portrait photography field is the use of computers and video charge coupled devices (CCDs) (also known as video recorders) in combination with the standard auto wind, auto focus photographic camera. U.S. Pat. No. 4,738,526 to Larish uses the video CCD to take a video image duplicate of a photographic image and then stores the video image on the computer for later viewing. The present patent application incorporates U.S. Pat. No. 4,738,526 to Larish by reference for all purposes. The Larish patent allows a customer to select from multiple images as to which image or images looked the best as a result of the subjects posture, pose, lighting, or other factors that go into selecting the proper portrait photograph. The Larish system, however, does not provide for the customer to view a video image within the perspective of a simulated room like a living room or dining room for instance. Nor does the Larish patent provide for the customer to view a video image within a customer selected picture frame, which can then be viewed if needed within the perspective of a simulated room setting image. The present invention overcomes these deficiencies by providing a method and apparatus that allows a customer to visually determine the appropriate size of a portrait photograph and matching picture frame by displaying upon a portrait display viewer a perspective view of a combined video image of the photograph and the matching frame within a simulated room image.

OBJECT AND SUMMARY OF THE INVENTION

An object of the present invention is to allow a customer to visually determine the appropriate size of a portrait photograph frame by displaying upon a portrait viewer a perspective view of a video image of the photographic image within a simulated room setting image.

Another object of the present invention is to allow a customer to visually determine the appropriate size of portrait photograph and matching picture frame by displaying upon a video portrait viewer a perspective view of a video image of the photographic image and the matching picture frame image within a simulated room setting image.

A feature of the present invention is combining a video image with a simulated room setting image to produce a perspective view of the video image as it would look within a typical room setting.

Another feature of the present invention is combining a video image with a picture frame image to produce a combined image showing the video image bordered by the picture frame image.

Another feature of the present invention is combining a video image with a picture frame image to produce a combined image showing the video image bordered by the picture frame image and then combining the combined image with a simulated room setting image to produce a perspective view of the combined image as it would look within a typical room setting.

An advantage of the present invention is that the customer can in one portrait sitting, with a high degree of confidence in the final product, take multiple shots of multiple poses, pick and choose from a variety of picture frames, and visually determine the appropriate portrait photograph size with a perspective view of the final product within simulated room setting display.

The present invention is an apparatus and method that enables a customer to visually determine the appropriate size of a portrait photograph and matching picture frame. A photographic camera capable of remote operation acquires a photographic image of the subject, which in this case is most likely the customer. Similarly, a video charge coupled device (CCD) camera, capable of remote operation, acquires a matching or duplicate video image of the subject. To aid the subject/customer in taking the portrait, the present invention includes a video preview monitor that allows the subject to see a real time video image from the video CCD camera. A computer connects to the photographic camera to control photographic functions and connects to the video CCD camera to control video functions. The computer synchronizes the acquisition of the photographic image from the photographic camera with the acquisition of the video image from the video CCD camera so that the video image is a duplicate image of the photographic image. The computer receives and stores the video image acquired from the video CCD camera. The present invention additionally has a video portrait viewer connected to the computer so that the subject can display the plurality of the video images previously acquired and stored on the computer. Using the touchscreen capabilities of the video portrait viewer, the customer is able to view multiple video images of multiple poses with varying lighting without costly development of the corresponding photographic images. To facilitate the customer in determining the appropriate size of the portrait photograph, the present invention combines one or more video images with a simulated room setting image upon the video portrait viewer. The simulated room setting image can be an image of a typical room, den, living room, bedroom or other type of environment suitable for displaying a portrait photograph. The present invention allows the customer to change the size of a video image or move a video image in relation to the simulated room setting image so that the customer can see a perspective view of one or more video images within the simulated room setting image. If the customer wants to have the portrait photograph within a picture frame, the present invention allows the customer to select a picture frame from a plurality of picture frame images. The selected video image will appear within the picture frame so that the customer can visually determine if the picture frame choice is correct. Additionally, one or more of the selected video images combined with the picture frame images can appear within the simulated room setting image so that the customer can view a perspective of the combined video image with bordering picture frame image within the simulated room setting image.

DESCRIPTION OF THE DRAWINGS

To further aid in understanding the invention, the attached drawings help illustrate specific features of the invention. The following is a brief description of the attached drawings.

DETAILED DESCRIPTION OF THE INVENTION

Consideration of the following example, which is purely exemplary, further clarifies the use of the invention.

Photographers can use video technology to facilitate and speed up the process of providing portrait photographs to potential customers. The present invention provides photographers with the ability to sell correctly sized portrait photographs and corresponding picture frames that will increase the number of large portrait sales the photographer is able to negotiate and finalize.

Figure 1:
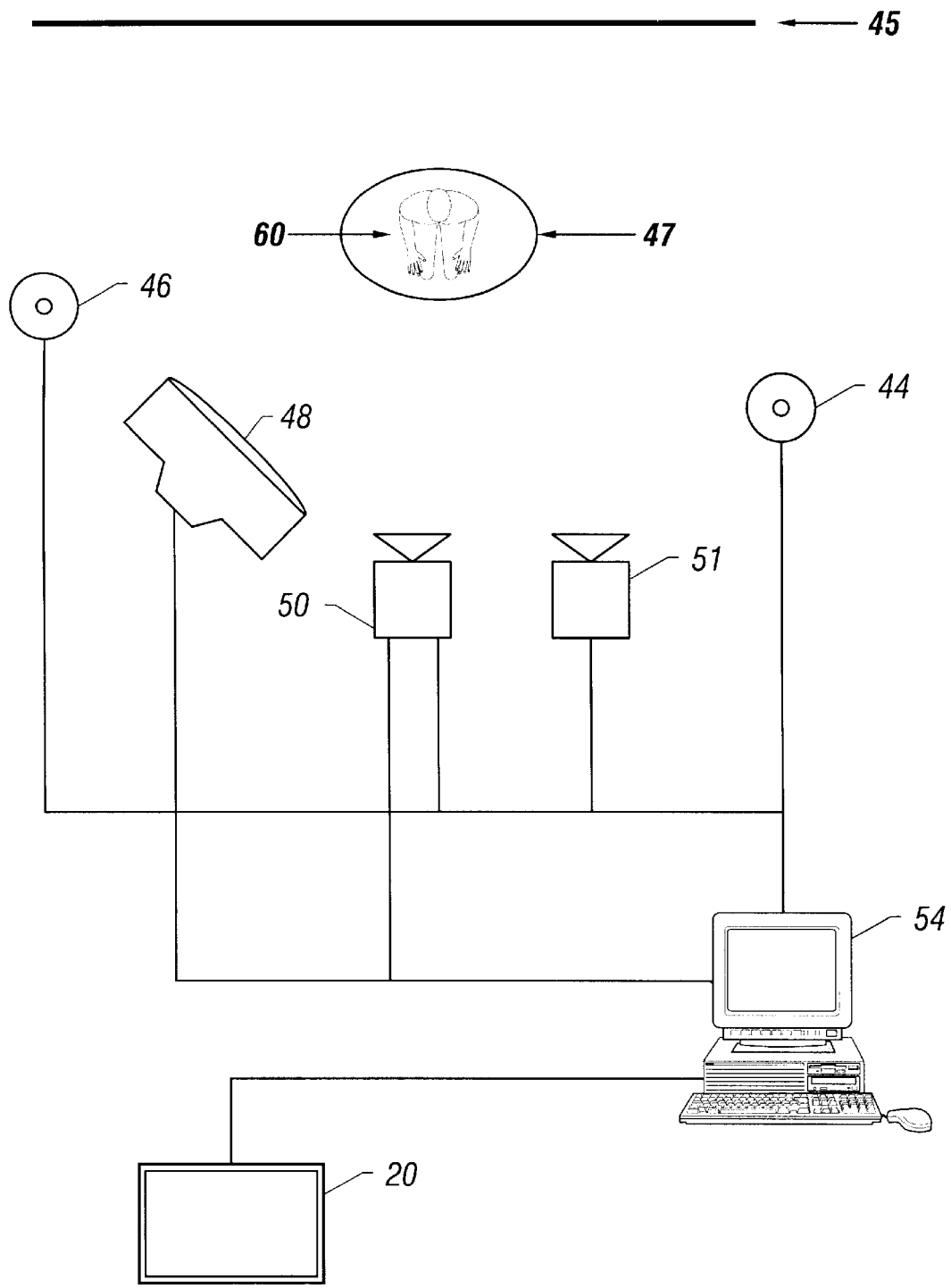
FIG. 1 block diagram of the preferred embodiment of the invention.

FIG. 1 is a block diagram of the preferred embodiment of the invention. The portrait subject 60, usually the customer, sits in subject location 47. Positioned around the portrait subject are photographic camera 51, video charged coupled device (CCD) camera 50, photography lights 44 and 46, video preview monitor 48, and background screen 45. Controlling the operations of the present invention is computer 54. Photography lights 44 and 46 and background screen 45 are of the type that are typically found in a professional photography studio. Photographic camera 51 includes auto-wind and auto-focus capabilities and contains means for remote control of the photographic functions of the camera. The remote control capability allows either the photographer or the subject to take or activate photographic camera 51 to take or acquire a picture (or photographic image). Photographic camera 51 sends a signal to photography lights 44 and 46 to flash and provide illumination on subject 60. Photographic camera 51 also sends the activation signal to computer 54. After receiving the activation signal from photographic camera 51, computer 54 sends an activation signal to video charge coupled device (CCD) camera 50 to take or acquire a video image of subject 60. Video CCD camera 50 contains means for remote control of the video functions of the camera. After acquiring the video image of subject 60, video CCD camera 50 sends the video image to computer 54 for storage and later retrieval and viewing. The present invention, therefore, allows the photographer to synchronize the activation of video CCD camera 50 to the activation of photographic camera 51 to effectively duplicate the photographic image with a video image. And finally, video preview monitor 20, with a touch-screen interface, connects to computer 54 permitting the photographer and the customer/subject to view and manipulate the video images. Since the video images are effectively duplicates of the photographic images, video preview monitor 20, in conjunction with the rest of the present invention, allows the customer or the photographer to select the best photographic image or images more quickly than previously done by actually developing film because all of the video images are available on computer 54. Additionally, the overall cost is much lower because there is less photographic film to develop because the photographer knows exactly what image or images to develop (previously picked by the customer) rather than developing all of the photographic images as done previously.

Figure 2:
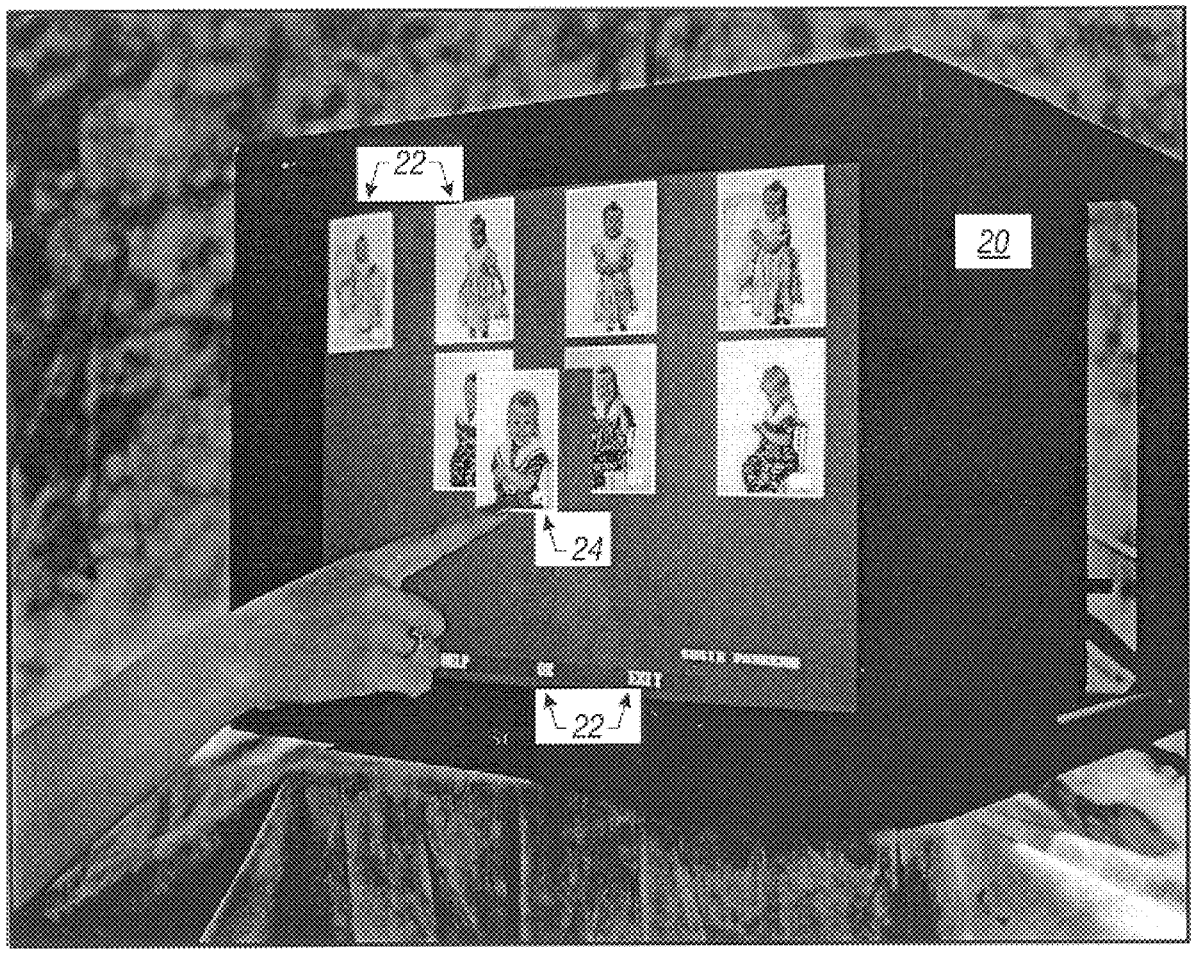
FIG. 2 shows an operator of the invention examining multiple video images on a video portrait viewer.

FIG. 2 illustrates an operator (photographer or customer) of the present invention using video portrait viewer 20 to select and manipulate previously stored video images 23. The touchscreen capability of video portrait viewer 20 allows the customer to select and position a single video image 24 or a plurality of video images with the tip of a finger. Option menu 22 provides user access to all of the functions of the present invention such as reducing or enlarging the selected video image.

Figure 3:
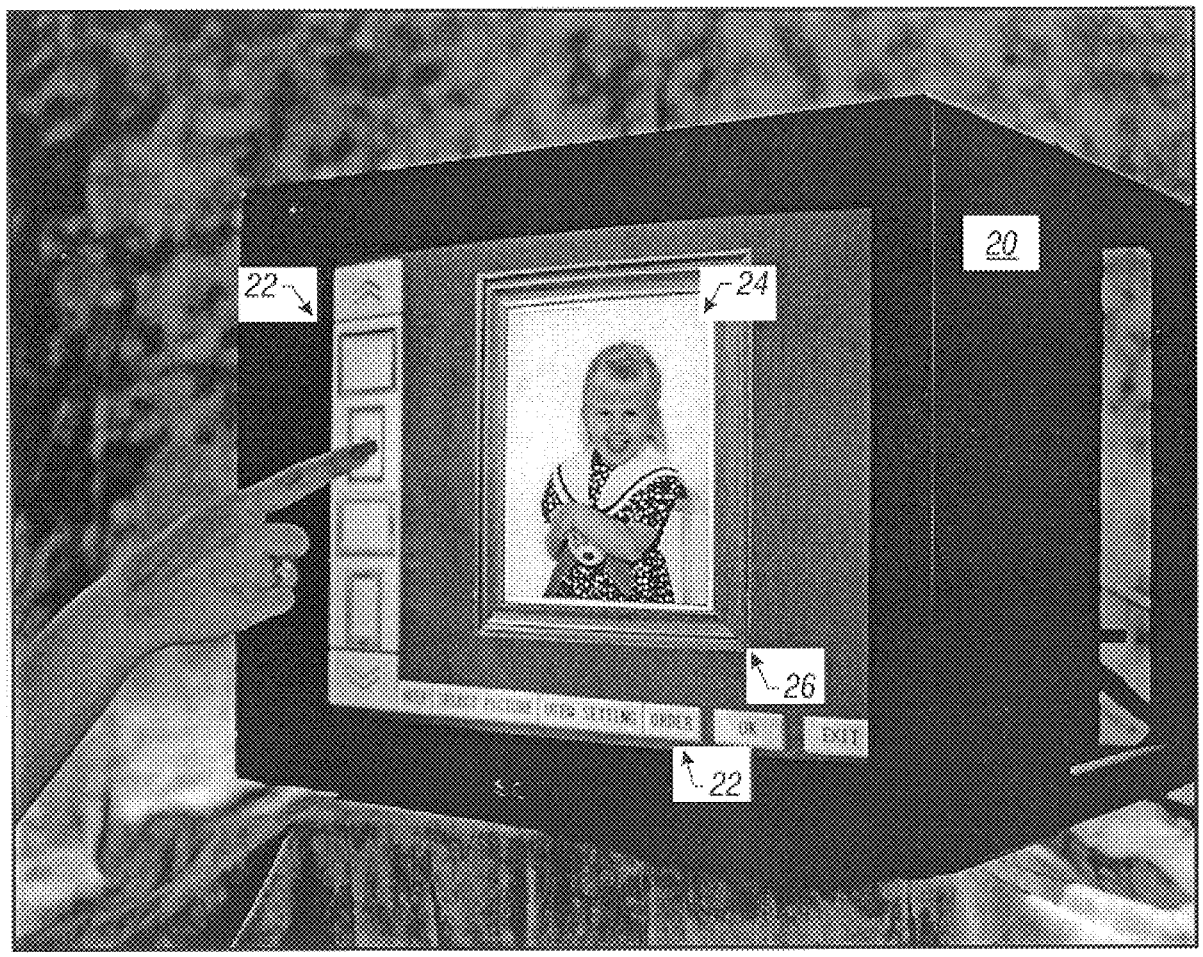
FIG. 3 illustrates the operator of the invention selecting a picture frame and displaying a video image within the selected frame image.

FIG.3 illustrates the operator using the present invention to view the selected video image 24 within the selected picture frame image 26. The selected video image is initially transposed as a 5"×7" image on video portrait viewer 20 with the operator being able to manipulate or post-process the video image in a variety of ways including reducing or enlarging the image, rotating the image, or repositioning the image on the video portrait viewer 20. The present invention includes previously stored images of picture frames available for viewing so that the operator can go through the picture frame images to find one suitable for the portrait. Essentially, the present invention incorporates a picture frame catalog within its storage system, with the further ability to combine the selected video image 24 with the selected picture frame image 26 to form a combined image as depicted in FIG. 3. The present invention allows a photographer to show the customer every existing style and color of picture frame available. The customer is then able to select from the many styles and types of picture frames that will best complement and display the portrait. All of the present invention's post processing capability is available for use on the combined picture frame image and video image.

Figure 4:
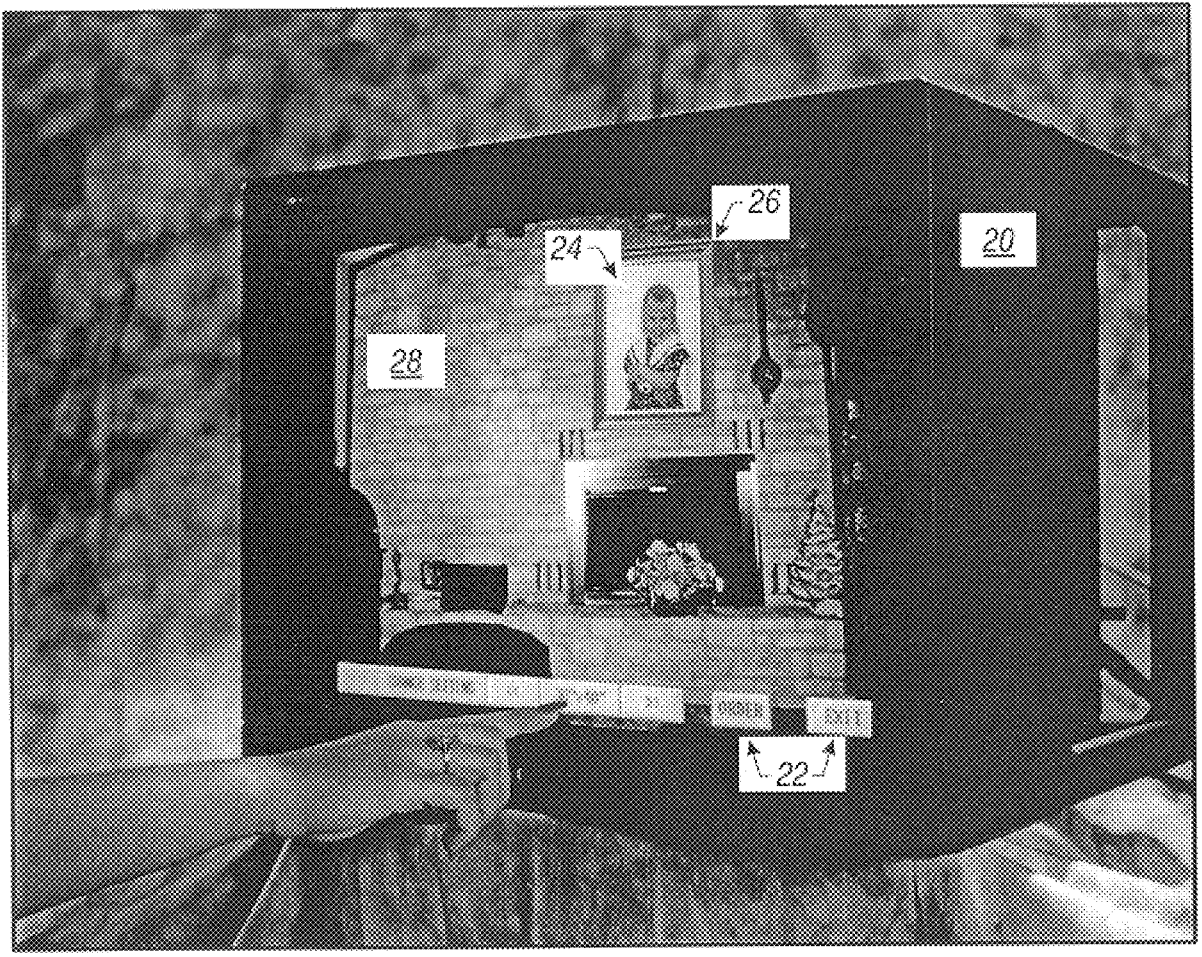
FIG. 4 shows a perspective view of the combined video image and the selected picture frame within a simulated room setting display.
Figure 5:
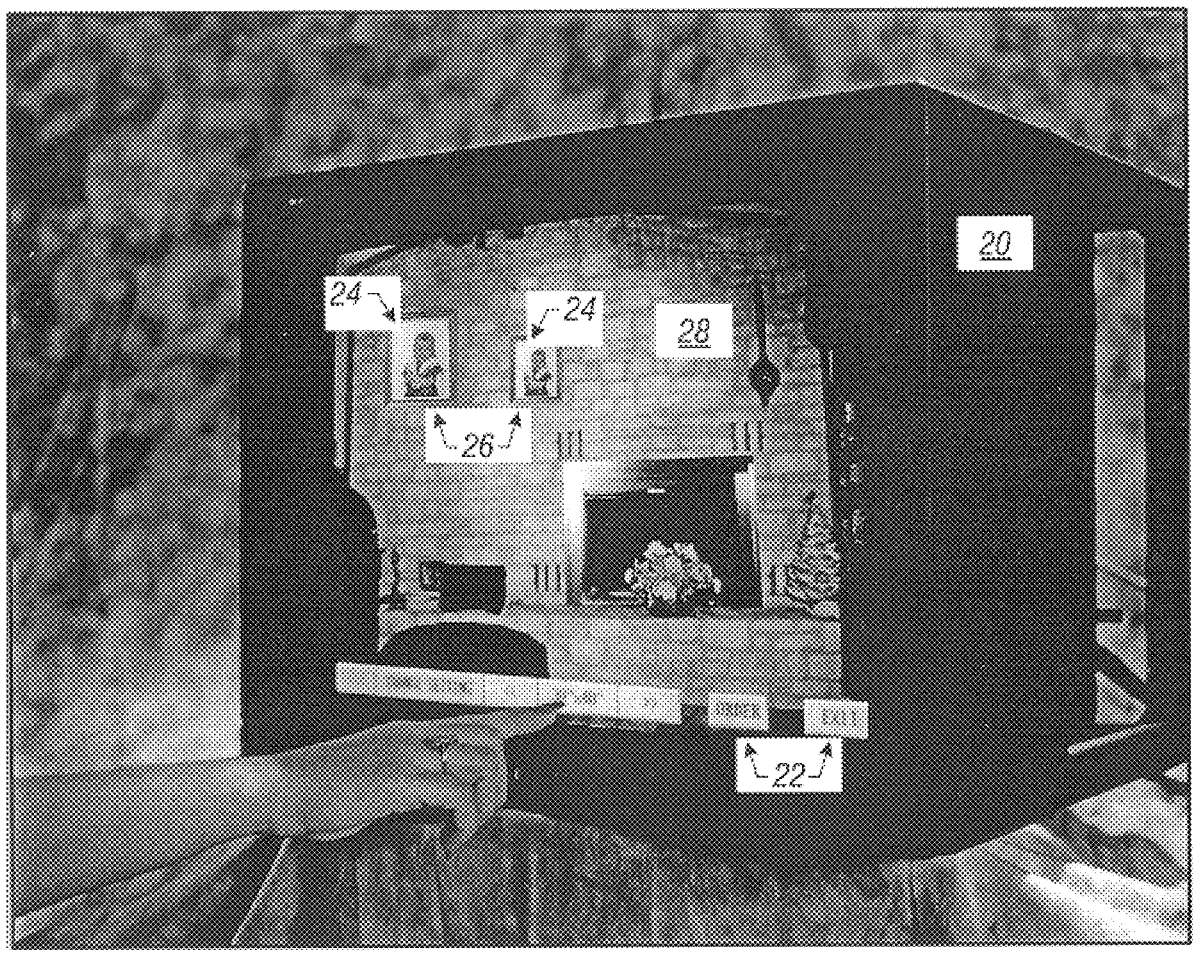
FIG. 5 shows the view of FIG. 4 with changed location and changed size perspective of the combined video image (with multiple video images) within the simulated room setting display.

Once satisfied with the combined image and referring now to FIG. 4, the customer can select a particular simulated room setting image 28 for displaying the combined image. The customer/operator scrolls through a series of simulated room setting images such as dens, living rooms, libraries, or bedrooms to find an image suitable for displaying the combined image. Like the picture frame images, the present invention includes previously stored images of simulated room settings for later retrieval. After selecting the simulated room setting image 28, the present invention combines the combined picture frame image 26 and video image 24 with the selected simulated room setting image as depicted in FIG. 4 to produce a simulated perspective room image. As previously stated, the present invention initially transposes the video image as a 5"×7" image; and when combined with the room image, the video image appears in a perspective view of the room image to produce a simulated perspective room image. In other words, the combined video and picture frame image appears to the customer on video portrait viewer 20 in a perspective view as 5"×7" picture would appear in the selected room setting. Upon seeing the perspective view, the customer can immediately determine whether the size of the portrait is correct, whether the picture frame matches the portrait, and whether the combined portrait and picture frame will match the selected room. The present invention as depicted in FIG. 5 allows the customer or operator to change the perspective of the video image (and the size of the resulting portrait) as well as move and position the combined image within the simulated room setting image. If for some reason, the customer does not want a picture frame, the present invention will work equally as well in displaying a video image of a portrait in a simulated perspective room image without a picture frame bordering the video image. Additionally, the present invention allows the customer to view one or more video images, with or without the picture frame image combination, in combination with the simulated room setting image so that the customer can see a perspective view of multiple portraits in a simulated room.

The present invention, as described above, allows a customer to match one or more selected video images of one or more portrait photographic images with an appropriate picture frame image. Additionally, the present invention allows the customer to view one or more selected video images, with or without a matching picture frame, within a simulated perspective room image to determine whether the final size of the portrait or portraits is correct. The present invention accomplishes all of this without the photographer needing to develop or frame a single photograph image.

Other embodiments of the invention will be apparent to those skilled in the art after considering this specification or practicing the disclosed invention. The specification and examples above are exemplary only, with the true scope of the invention being indicated by the following claims.

I claim:

1. An apparatus for portrait photography for aiding in determining the appropriate size perspective of a portrait photograph that combines a video image of a photographic image with a simulated room setting image to form a simulated perspective room image, comprising:

a photographic camera for acquiring a photographic image;

a video charge coupled device for acquiring a video image;

a computer connected to said photographic camera to control photographic functions and connected to said video charge coupled device to control video functions, said computer synchronizes the acquisition of said photographic image from said photographic camera to the acquisition of said video image from said video charge coupled device, said computer receives and stores said acquired video image from said video charge coupled device;

a video portrait viewer for displaying one or more said video images stored on said computer;

a simulated room setting image; and a simulated perspective room image that combines one or more images of said video image with said simulated room setting image, said computer transposes the size perspective of said video image wherein said video image appears as a selected size perspective within said simulated room setting image.

2. The apparatus of claim 1 further comprising:

a picture frame image from a plurality of picture frame images; and a combined image from combining said picture frame image with said video image, said picture frame image becomes the border for said video image.

3. The apparatus of claim 1 further comprising:

means for changing the location for said video image within said simulated perspective room image.

4. A system for portrait photography for aiding in determining the appropriate size perspective of a portrait photograph that combines a video image of a photographic image with a simulated room setting image to form a simulated perspective room image, comprising:

photographic means for acquiring a photographic image;

video means for acquiring a video image;

computer means for controlling photographic functions of said photographic means and controlling video functions of said video means, said computer means synchronizes the acquisition of said photographic image from said photographic means to the acquisition of said video image from said video means, said computer means receives and stores said video image from said video means;

video portrait viewing means for displaying one or more said video images stored on said computer means;

a simulated room setting image; and means for combining one or more said video images with said simulated room setting image to form a simulated perspective room image, said computer transposes the size perspective of said video image wherein said video image appears as a selected size perspective within said simulated room setting image.

5. The apparatus of claim 4 further comprising:

means for displaying a picture frame image from a plurality of picture frame images; and means for combining said picture frame image with said video image, said picture frame image becomes the border for said video image.

6. The apparatus of claim 4 further comprising:

means for changing the location of said video image within said simulated perspective room image.

7. A method for portrait photography for aiding in determining the appropriate size perspective of a portrait photograph that combines a video image of a photographic image with a simulated room setting image to form a simulated perspective room image, comprising the steps of:

acquiring a photographic image;

acquiring and storing a video image;

synchronizing the acquisition of said photographic image to the acquisition of said video image;

displaying one or more said video images;

combining one or more said video images with a simulated room setting image to form a simulated perspective room image; and transposing the size perspective of said video image wherein said video image appears as a selected size perspective within said simulated room setting image.

8. The method of claim 7 further comprising the steps of:

selecting a picture frame image from a plurality of picture frame images; and combining said picture frame image with said video image forming a combined image, said picture frame image borders said video image.

9. The method of claim 7 further comprising the step of:

positioning the location of said video image within said simulated perspective room image.

10. A program storage device readable by a machine, tangibly embodying a program of instructions executable by the machine to perform method steps for a method of portrait photography for aiding in determining the appropriate size perspective of a portrait photograph that combines a video image of a photographic image with a simulated room setting image to form a simulated perspective room image, comprising the steps of:

acquiring a photographic image;

acquiring and storing a video image;

synchronizing the acquisition of said photographic image to the acquisition of said video image;

displaying one or more said video images;

combining one or more said video images with a simulated room setting image to form a simulated perspective room image; and transposing the size perspective of said video image wherein said video image appears as a selected size perspective within said simulated room setting image.

11. The program storage device of claim 10 further comprising the steps of:

selecting a picture frame image from a plurality of picture frame images; and combining said picture frame image with said video image forming a combined image, said picture frame image borders said video image.

12. The program storage device of claim 10 further comprising the step of:

positioning the location of said video image within said simulated perspective room image.

* * * * *

UNITED STATES PATENT AND TRADEMARK OFFICE
CERTIFICATE OF CORRECTION

PATENT NO. : 6,047,130  
DATED : April 4, 2000  
INVENTOR(S) : Henry Oles

Page 1 of 1

It is certified that error appears in the above-identified patent and that said Letters Patent is hereby corrected as shown below:

In the Title Page:

Column 1, in the name of the Assignee, replace "Protection" with --Projection--.

Signed and Sealed this

Fifth Day of June, 2001

*Attest:*

*Attesting Officer*

NICHOLAS P. GODICI  
*Acting Director of the United States Patent and Trademark Office*